US008516607B2

(12) United States Patent
Mao et al.

(10) Patent No.: US 8,516,607 B2
(45) Date of Patent: Aug. 20, 2013

(54) FACILITATING DATA ACCESS CONTROL IN PEER-TO-PEER OVERLAY NETWORKS

(75) Inventors: Yinian Mao, San Diego, CA (US); Vidya Narayanan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 13/113,813

(22) Filed: May 23, 2011

(65) Prior Publication Data

US 2012/0304313 A1    Nov. 29, 2012

(51) Int. Cl.
*H04L 29/06* (2006.01)
*G06F 7/04* (2006.01)
*G06F 15/16* (2006.01)
*G06F 17/30* (2006.01)
*H04N 7/16* (2011.01)

(52) U.S. Cl.
USPC ............... 726/29; 726/3; 726/27; 709/201; 709/204; 709/218; 709/225; 709/246; 713/156

(58) Field of Classification Search
None
See application file for complete search history.

(56) References Cited

U.S. PATENT DOCUMENTS

| 6,212,633 B1 * | 4/2001 | Levy et al. ................... 713/153 |
| 7,024,429 B2 | 4/2006 | Ngo et al. |
| 7,185,047 B1 | 2/2007 | Bate et al. |
| 7,200,862 B2 * | 4/2007 | Murching et al. ............... 726/3 |
| 7,340,500 B2 * | 3/2008 | Traversat et al. ............. 709/201 |
| 7,613,701 B2 | 11/2009 | Zhao et al. |
| 7,774,010 B2 * | 8/2010 | Kokkonen et al. ............ 455/518 |
| 8,001,150 B2 * | 8/2011 | Kim ............................... 707/791 |
| 8,166,565 B1 * | 4/2012 | Tormasov et al. ............... 726/27 |
| 2003/0079123 A1 * | 4/2003 | Mas Ribes .................... 713/156 |
| 2004/0148434 A1 * | 7/2004 | Matsubara et al. ........... 709/246 |
| 2006/0026286 A1 | 2/2006 | Lei et al. |

(Continued)

FOREIGN PATENT DOCUMENTS

| EP | 1694027 A1 | 8/2006 |
| WO | 2009061063 A1 | 5/2009 |
| WO | WO2010/043175 | 4/2010 |

OTHER PUBLICATIONS

Bindel, D. et al., "OceanStore: An Extremely Wide-Area Storage System", Internet Citation, Mar. 1999, XP002387709, Retrieved from the Internet: URL: http://oceanstore.cs.berkeley.edu/publications/papers/pdf/oceanstore-tr-may99.pdf [retrieved on Jun. 28, 2006].

(Continued)

*Primary Examiner* — Shin-Hon Chen
(74) *Attorney, Agent, or Firm* — Won Tae Kim

(57) ABSTRACT

Methods and apparatuses are provided for facilitating data access controls in peer-to-peer or other similar overlay networks. A peer node storing a data object may receive a request for access to the stored data object, and may locate in the network an access control list associated with the data object using a routing mechanism included in the data object. The peer node may determine whether the requested access is authorized based on the access control list, and may grant or deny access based on the determination. A peer node storing an access control list may receive a request from a peer node storing a data object for information relating to access controls associated with the data object. The peer node storing the access control list may then send the requested information relating to the access controls associated with the data object.

37 Claims, 6 Drawing Sheets

(56) References Cited

U.S. PATENT DOCUMENTS

| | | | |
|---|---|---|---|
| 2007/0086435 A1* | 4/2007 | Kaler | 370/352 |
| 2007/0123226 A1* | 5/2007 | Liang et al. | 455/414.1 |
| 2007/0150551 A1* | 6/2007 | Krishnan et al. | 709/218 |
| 2008/0256138 A1 | 10/2008 | Sim-Tang | |
| 2008/0279200 A1* | 11/2008 | Shatzkamer et al. | 370/401 |
| 2010/0115031 A1* | 5/2010 | Lin et al. | 709/204 |
| 2011/0196966 A1* | 8/2011 | Chai et al. | 709/225 |

OTHER PUBLICATIONS

Distributed hash table, Wikipedia Apr. 22, 2011, XP55036055, Retrieved from the Internet: URL:http://web.archive.org/web/20110422221304/http://en.wikipedia.org/wiki/Distributed_hash_table [retrieved on Aug. 22, 2012].

International Search Report and Written Opinion—PCT/US2012/039049—ISA/EPO—Aug. 30, 2012.

* cited by examiner

FACILITATING DATA ACCESS CONTROL IN PEER-TO-PEER OVERLAY NETWORKS

BACKGROUND

1. Field

Various features disclosed herein pertain generally to peer-to-peer overlay networks, and at least some features pertain to devices and methods for facilitating data access controls in peer-to-peer overlay networks.

2. Background

Peer-to-peer (or P2P) and other similar overlay networks include a distributed application architecture that partitions tasks or workloads between peers. Such peer-to-peer overlay networks can be built on top of an underlying network, such as a network utilizing the Internet Protocol (IP).

Typically, peers are equally privileged, equipotent participants in the application, and are typically said to form a peer-to-peer network of nodes. The various peer nodes cooperate with each other both to provide services and to maintain the network. Peer nodes typically make a portion of their resources, such as processing power, disk storage or network bandwidth, directly available to other network participants, without the need for central coordination by servers or stable hosts. Generally speaking, the peer nodes are both suppliers and consumers of resources, in contrast to the traditional client-server model where only servers supply, and clients consume.

Peer-to-peer and similar networks can be employed in many environments for low-cost scalability and easy deployment of applications. For example, in a home environment, a plurality of nodes can be connected together in a peer-to-peer network, such as computers, televisions, cellular phones, printers or other devices with network interface capabilities for communicating and sharing data. Typically, such networks are relatively open, allowing devices (i.e., nodes) to join and leave at will. In some implementations of such a network, a user's data can be stored in a distributed fashion on a remote node in the network, which might be known or unknown to the user. As a result some users may not have full confidence in the overlay's data storage capability unless there are assurances that the user's data will not be accessed (e.g., read and/or modified) in unauthorized fashion. The data owner may, therefore, be able to specify access controls defining who can access the stored data objects.

Because there is no central coordination by servers or stable hosts to facilitate centrally implemented access control lists, each data object in a conventional peer-to-peer overlay network may contain its own respective access control list indicating the access control policy for that particular data object. The access control list is attached to each data object (e.g., a file) to specify the access information for the respective data object. However, storage overhead is relatively large with each data object having its own access control list. In addition, since an access control list increases the size of the data object, there is an increase in required bandwidth in order to transmit the data object between peer nodes. Therefore, there is a need for systems, devices and/or methods for facilitating access control for data objects in peer-to-peer and similar overlay networks that are not centrally coordinated by servers or stable hosts.

SUMMARY

Various features provide peer nodes for facilitating access control for data objects in a peer-to-peer overlay network. One feature provides peer nodes storing a data object therein. Such peer nodes may include a communications interface and a storage medium, each coupled to a processing circuit. The communications interface is adapted to facilitate communication on a peer-to-peer overlay network. The storage medium may include a data object stored therein, where the data object includes a routing mechanism adapted to be utilized in locating an access control list associated with the data object within the peer-to-peer overlay network.

According to various implementations, the processing circuit may be adapted to receive a request from a requesting peer node for access to the data object in the storage medium. The processing circuit may locate the access control list in the peer-to-peer overlay network using the routing mechanism included with the data object, and may determine whether the access requested by the requesting peer node is authorized based on the access control list. Based on whether the access control list authorizes the requested access, the processing circuit may grant or deny access to the data object for the requesting peer node.

Methods operational in an access terminal are also provided according to a feature for facilitating access control for data objects in a peer-to-peer overlay network. For instance, a data object may be stored in a storage medium. The data object may include a routing mechanism adapted to locate an access control list associated with the data object within the peer-to-peer overlay network. A request may be received from a requesting peer node for access to the stored data object. The peer node may then locate the access control list in the peer-to-peer overlay network using the routing mechanism included with the data object, and may determine whether the access requested by the requesting peer node is authorized based on the access control list. Access to the data object may be granted or denied for the requesting peer node based on whether the access control list authorizes the requested access.

Additional features provide peer nodes storing an access control list adapted for facilitating access control for a data object in a peer-to-peer overlay network. Such peer nodes may include a communications interface and a storage medium, each coupled to a processing circuit. The communications interface may be adapted to facilitate communication on the peer-to-peer overlay network. The storage medium may include an access control list stored therein, where the access control list is adapted to indicate access controls for at least one associated data object.

The processing circuit may be adapted to receive a first transmission from a peer node storing a data object associated with the access control list. The first transmission can include a request for information relating to access controls associated with the data object. For example, the first transmission may include a request for the access control list, or an inquiry requesting an indication whether an access to the data object requested by a requesting peer node is authorized. The processing circuit may then send a second transmission to the peer node storing data object in response to the first transmission. The second transmission may include the requested information relating to the access controls associated with the data object.

Methods operational in an access terminal are also provided according to a feature for facilitating access control for data objects in a peer-to-peer overlay network. For instance, an access control list may be stored in a storage medium. The access control list can be adapted to indicate access controls for at least one associated data object. A first transmission may be received from a peer node storing a data object associated with the access control list. The first transmission may include a request for information relating to access controls associated with the data object. Furthermore, a second transmission may be sent to the peer node storing the data object in response to the first transmission. The second transmission can include the requested information relating to the access controls associated with the data object.

DETAILED DESCRIPTION

Figure 1:
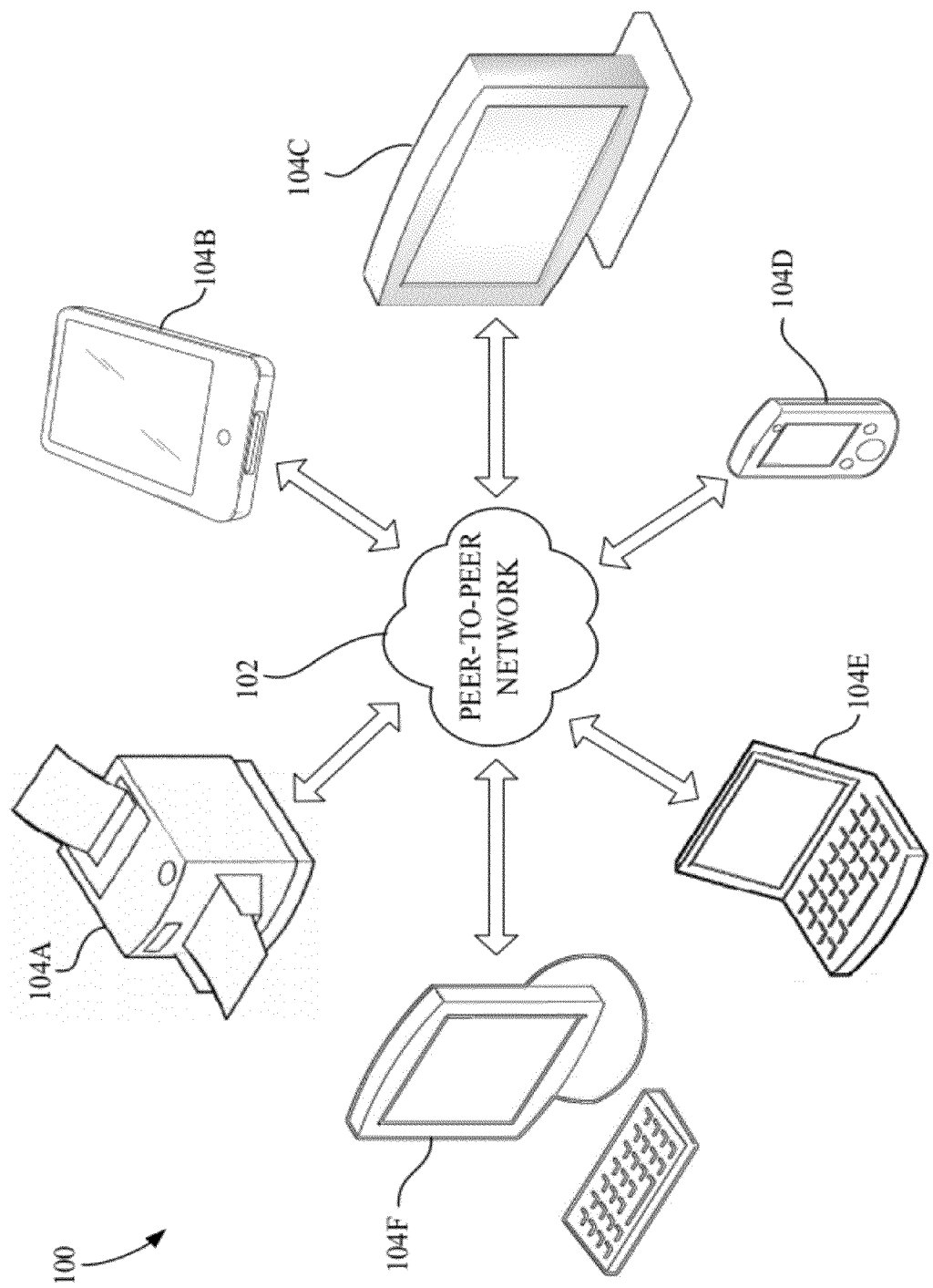
FIG. 1 is a block diagram illustrating a network comprising an overlay network that is not centrally coordinated by servers or stable hosts in which data objects may be stored among nodes of the overlay network.

In the following description, specific details are given to provide a thorough understanding of the described implementations. However, it will be understood by one of ordinary skill in the art that various implementations may be practiced without these specific details. For example, circuits may be shown in block diagrams in order not to obscure the implementations in unnecessary detail. In other instances, well-known circuits, structures and techniques may be shown in detail in order not to obscure the described implementations.

The word "exemplary" is used herein to mean "serving as an example, instance, or illustration." Any implementation or embodiment described herein as "exemplary" is not necessarily to be construed as preferred or advantageous over other embodiments or implementations. Likewise, the term "embodiments" does not require that all embodiments include the discussed feature, advantage or mode of operation. The terms "peer-to-peer overlay network" and "peer node" as used herein are meant to be interpreted broadly. For example, a "peer-to-peer overlay network" may refer to an overlay network that is not centrally coordinated by servers or stable hosts and that includes a distributed application architecture that partitions tasks or workloads between peers. Furthermore, a "peer node" may refer to a device that facilitates communication on a peer-to-peer overlay network. Examples of "peer nodes" may include printers, tablet computers, televisions, mobile phones, personal digital assistants, personal media players, laptop computers, notebook computers, desktop computers, etc.

Overview

One feature facilitates access controls for data objects stored within a peer-to-peer overlay network. For every data object stored in the peer-to-peer overlay network that requires access control, a routing mechanism is added thereto. This routing mechanism specifies the location within the peer-to-peer overlay network of an access control list (ACL), which specifies the access policy to the data object. The data object (including the routing mechanism) is then stored in the peer-to-peer overlay network and may eventually be stored on one of the peer nodes. Later, when another peer node requests access to the data object, the peer node storing the data object will use the routing mechanism in the data object to retrieve information from the peer-to-peer overlay network relating to the access policies specified by the access control list (ACL). The peer node storing the data object can authenticate the identity of the peer node requesting access to the data object and can determine if the requesting peer node's identity is allowed to perform the type of access requested. If the access is allowed according to the access control list (ACL), the peer node storing the data object can grant the access. If the access is not allowed according to the access control list (ACL), the peer node storing the data object can deny the access.

Exemplary Network Environments

FIG. 1 is a block diagram illustrating a network 100 comprising an overlay network that is not centrally coordinated by servers or stable hosts in which data objects may be stored among nodes of the overlay network. The overlay network may comprise a peer-to-peer overlay network 102 which is built on top of another network. In some examples, the peer-to-peer overlay network 102 can be implemented to operate at the highest layer of the communication protocol stack (e.g., the application layer). Such a peer-to-peer overlay network 102 may utilize any type of underlying network, such as an Internet Protocol network, to allow a plurality of peer nodes 104A-104F on the overlay network 102 to communicate with each other. The underlying network may comprise any number of types of network, such as Wide Area Networks (WAN), Local Area Networks (LAN), wireless networks (e.g., WWAN, WLAN) and/or any other type of network.

Peer nodes 104A-104F can include any device adapted to communicate via the peer-to-peer overlay network 102. Such devices may include a middleware layer adapted to facilitate communications via the peer-to-peer overlay network 102. By way of example and not limitation, peer nodes can include devices such as printers 104A, tablet computers 104B, televisions 104C, mobile phones, personal digital assistants, and personal media players 104D, laptop and notebook computers 104E, and/or desktop computers 104F.

Figure 2:
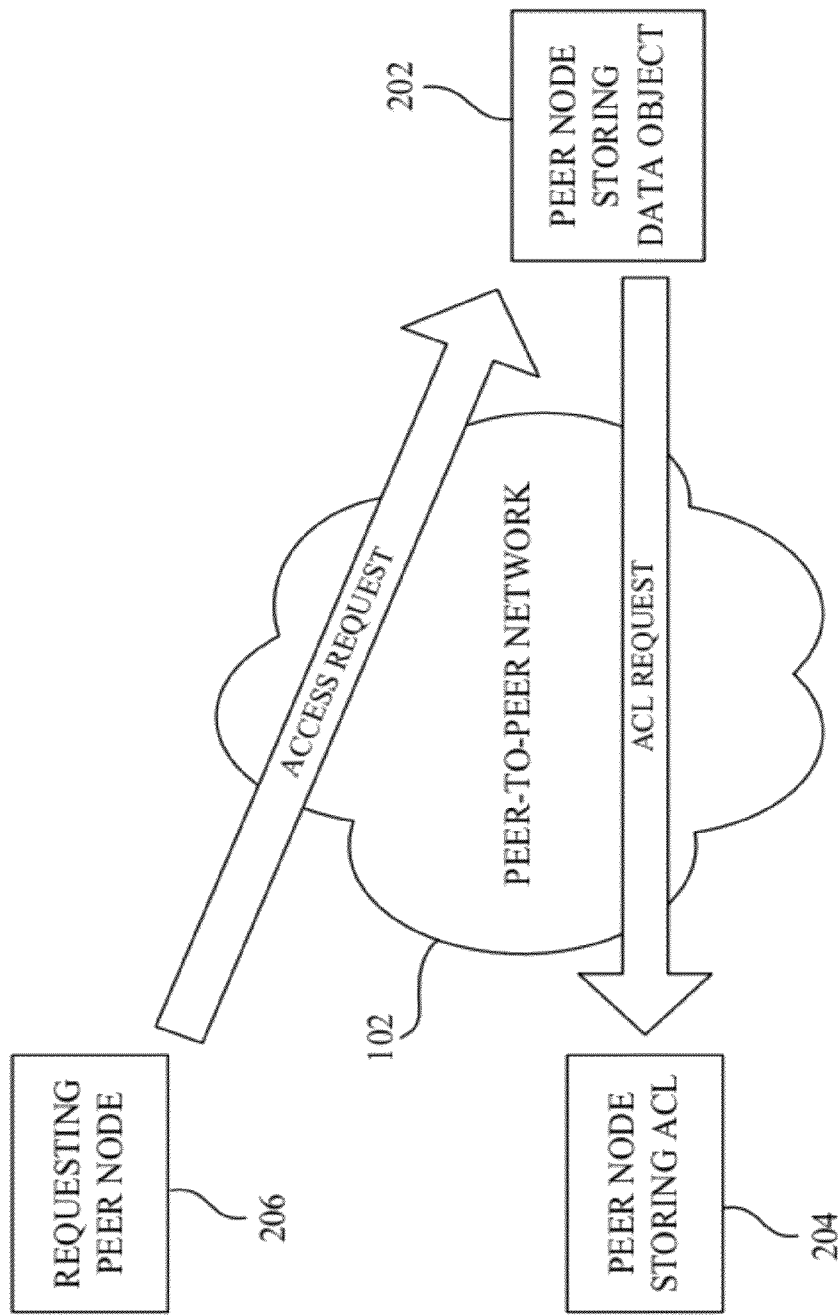
FIG. 2 illustrates a network environment for facilitating access control for data objects that have been stored in an overlay network that is not centrally coordinated by servers or stable hosts.

Employing the peer-to-peer overlay network 102, each of the peer nodes 104A-104F are able to communicate with other peer nodes 104A-104F without the need for central coordination by servers or stable hosts. For example, each of the peer nodes 104A-104F can make a portion of their resources (e.g., processing power, disk storage, network bandwidth) available to another peer node, and can utilize a portion of another peer node's resources without a server or stable host for central coordination. In at least some implementations, at least some of the peer nodes 104A-104F may store a data object in the peer-to-peer overlay network 102. When the data object is stored in the peer-to-peer overlay network 102, an identifier associated with the data object is employed to locate the data object within the peer-to-peer network when access to the data object is desired. The data object is then stored within the peer-to-peer overlay network 102 by storing the data object at one of the other peer nodes 104A-104F. Using, for example, a distributed hash table (DHT), the peer-to-peer overlay network can employ an object's identifier to route messages and requests to the correct peer node Facilitating Access Control in the Exemplary Network Environment According to a feature, the owner of a data object can specify access controls for the data object that is stored in the peer-to-peer network overlay 102. That is, a peer node 104A-104F and/or its user can specify what other peer nodes and/or other users are authorized to access the data object that it has stored in the peer-to-peer overlay network 102. FIG. 2 illustrates a network environment for facilitating access control for data objects that have been stored in an overlay network that is not centrally coordinated by servers or stable hosts, such as a peer-to-peer overlay network 102. When the data object is stored in the peer-to-peer overlay network 102, it may eventually be stored on a peer node 202 identified in FIG. 2 as the peer node storing the data object.

According to a feature, the access control list (ACL) associated with the data object is stored in the peer-to-peer overlay network 102 as a separate data object independent from the stored data object. As shown in the example of FIG. 2, the access control list (ACL) can be stored at a peer node 204, indicated as the peer node storing the ACL. In some implementations, the peer node 204 storing the ACL is not a centralized node or designated administrator node. That is, the peer node 204 storing the ACL does not act as a centralized node where all access control lists (ACLs) may be stored, and is not implemented to store an access control list (ACL) associated with all the data objects in the peer-to-peer overlay network 102. Instead, a plurality of access control lists (ACLs) associated with a plurality of different data objects in the peer-to-peer overlay network 102 may be stored at a plurality of different peer nodes within the peer-to-peer overlay network 102. Thus, different peer nodes may store an ACL associated with different data objects. It should be noted that in some implementations, the peer node 202 storing the data object and the peer node 204 storing the ACL can be the same peer node, but the data object and the access control list (ACL) are stored as separate objects. With reference to the network 100 shown in FIG. 1, any one of the peer nodes 104A-104F could comprise the peer node 202 storing the data object and/or the peer node 204 storing the ACL. In some instances, two or more of the peer nodes 104A-104F may be employed to store different respective access control lists (ACLs) associated with different data objects in the peer-to-peer overlay network 102, resulting in each of the two or more peer nodes 104A-104F comprising a peer node 204 storing an ACL.

The access control list (ACL) is adapted to specify the access policy to the data object stored at the peer node 202. According to at least some implementations, the peer-to-peer overlay network 102 may specify the format for the access control list (ACL) such that the middleware of each peer node on the peer-to-peer overlay network 102 can understand the specified format. The access control list (ACL) can specify whether a peer node, a user and/or a group of users in the peer-to-peer overlay network 102 can obtain a certain type of access (e.g., read, read/write).

Referring still to FIG. 2, the data object having some form of access controls and which is stored at the peer node 202 includes a routing mechanism, such as a location indicator, indicating how and/or where to find the access control list (ACL) in the peer-to-peer overlay network 102. According to at least some implementations, the routing mechanism included with the data object may comprise a Universal Resource Identifier (URI) that has been included with the data object for use in locating the associated access control list (ACL) within the peer-to-peer overlay network 102.

One or more peer nodes may subsequently request access to the stored data object via the peer-to-peer overlay network 102. Such a peer node is illustrated in FIG. 2 as a requesting peer node 206. Using an identifier associated with the data object, the peer-to-peer overlay network 102 directs or routes the request to the peer node 202 where the data object is stored. In at least some implementations, the peer-to-peer overlay network employs a distributed hash table (DHT) to discover where the data object is located within the overlay network for the associated identifier. As used herein, an access request may comprise a request for one of various levels of access, including but not limited to, read access or reading/modifying access (i.e., read/write access).

Generally speaking, when a requesting peer node 206 sends an access request for the data object, the peer node 202 storing the data object can employ the routing mechanism included with the stored data object to determine the location of the associated access control list. The storing peer node 202 can send a request to the peer node 204 storing the ACL to obtain the access control list and/or a verification that the access control list indicates the requesting peer node 206 is authorized to access the data object according to the requested access level (e.g. read access, read/write access).

For example, if the data object comprises a document stored in the peer-to-peer overlay network 102, a requesting peer node 206 can request access to the document (e.g., read or read/write) from the peer-to-peer network. The peer node 202 storing the document may employ a routing mechanism that has been added to the document to send a request for access to the access control list (ACL) associated with the document. In some implementations, the peer node 202 may obtain a copy of the access control list (ACL) from the peer node 204 storing the access control list (ACL) and may determine whether the access control list (ACL) indicates that the requesting peer node 206 is authorized to read or modify the document, as requested.

Figure 3:
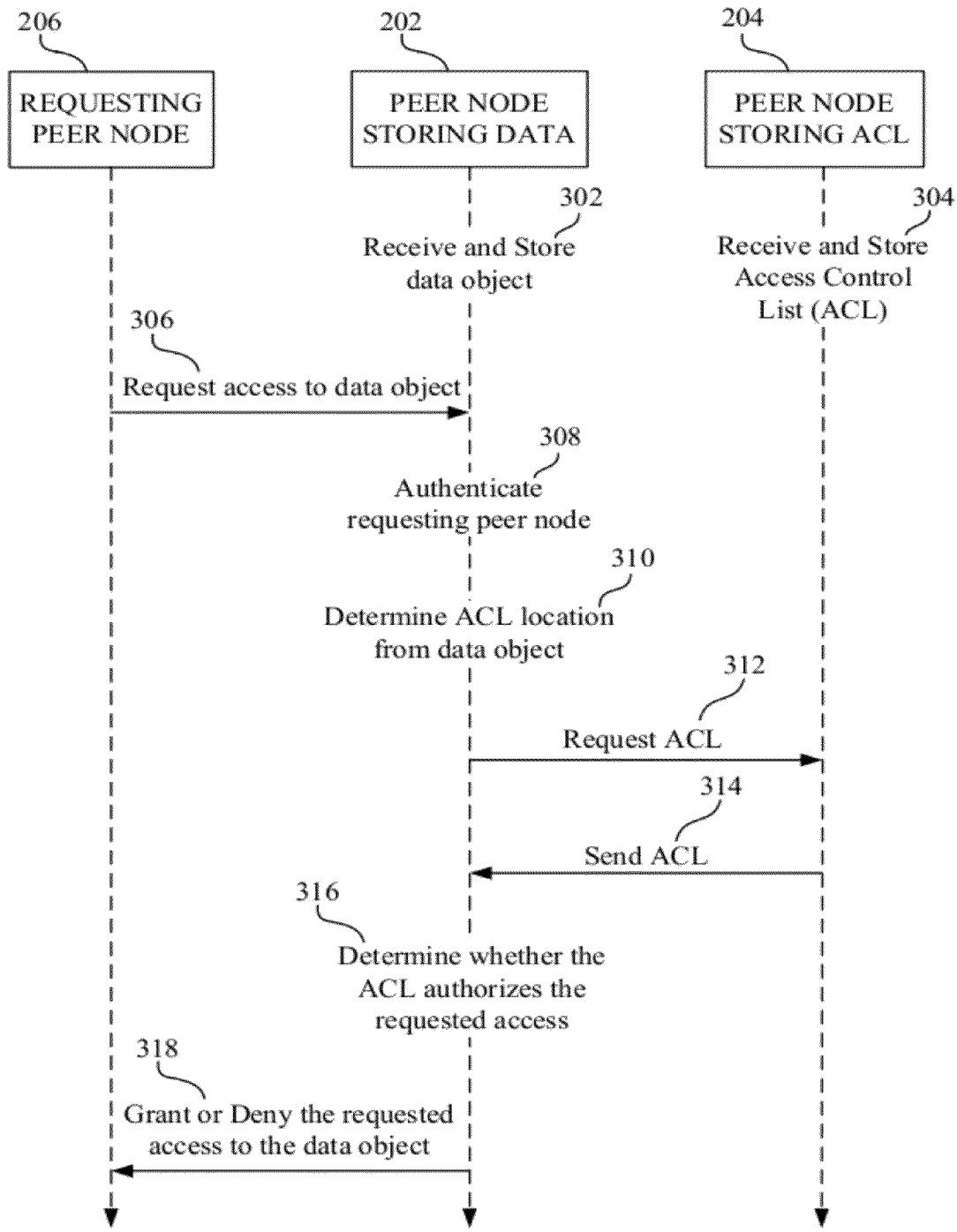
FIG. 3 is a flow diagram illustrating an example of at least some steps for facilitating access control for a data object stored in a peer-to-peer or similar overlay network.

Turning to FIG. 3, a flow diagram is shown illustrating an example of at least some steps for facilitating access control for a data object stored in a peer-to-peer or similar overlay network. In this example, the peer node 202 storing the data object, the peer node 204 storing the ACL, and the requesting peer node 206 of FIG. 2 are used for illustration purposes. Initially, at step 302, the peer node 202 may receive and store a data object that some other peer node has stored in the peer-to-peer overlay network. In this example, access to the data object may be restricted for one or more peer nodes in the peer-to-peer overlay network. Therefore, an access control list (ACL) associated with the stored data object is received by, and stored at the peer node 204, as shown at step 304.

At step 306, a requesting peer node 206 may request access to the data object via the peer-to-peer overlay network, which request is directed or routed by the overlay network to the peer node 202 storing the data object. Upon receiving the request, the peer node 202 storing the data object may, at step 308, authenticate the identity of the requesting peer node 206. Such authentication may comprise any conventional means employed to authenticate a device communicating with another device in a communication network, and may be carried out by either the peer node storing the data object 202 or another peer node in the peer-to-peer overlay network. By way of example and not limitation, the requesting peer node 206 may be authenticated using a conventional digital signature authentication, challenge-response authentication, etc.

After the peer node 202 storing the data object authenticates the requesting peer node 206, the peer node 202 storing the data object may retrieve the requested data object, and may determine from the data object how and/or where to find the access control list (ACL) associated with the data object at step 310. For example, the data object can include a routing mechanism, such as a location indicator, indicating how and/or where to find the access control list (ACL) in the peer-to-peer overlay network. As noted above, the routing mechanism included with the data object may include a Universal Resource Identifier (URI) employable for locating the associated access control list (ACL) within the peer-to-peer overlay network. According to at least one implementation, the peer-to-peer overlay network may be adapted to employ one or more distributed hash tables (DHT) to route messages and requests for a given routing mechanism (e.g., URI).

The peer node 202 storing the data object may send a request via the peer-to-peer overlay network to obtain the access control list (ACL), or at least a copy thereof, at step 312. The peer node 204 storing the access control list (ACL) may retrieve the access control list (ACL) and may send it (or a copy thereof) to the peer node 202 storing the data object at step 314.

The peer node 202 storing the data object receives the access control list (ACL) and determines whether the access control list (ACL) authorizes the requesting peer node 206 to access the data object as requested, at step 316. If the access control list (ACL) indicates that the requesting peer node 206 is authorized to access the data object as requested, then the peer node 202 storing the data object may grant the request at 318. If, however, the access control list (ACL) indicates that the requesting peer node 206 is not authorized to access the data object as requested, then the peer node 202 storing the data object may deny the request at 318.

It is noted that the implementation illustrated by FIG. 3 includes the peer node 202 storing the data object determining directly whether the requested access is authorized by obtaining the access control list (ACL), or a copy thereof, and employing the access control list (ACL) to determine whether the requesting peer node 206 is authorized to access the data object. It is noted, however, that in various alternative implementations, the peer node 202 storing the data object may indirectly determine whether the requested access is authorized by receiving an indication from another peer node whether the access control list authorizes the requested access. For example, another peer node may be employed to identify whether the access control list (ACL) indicates that the requesting peer node 206 is authorized to access the data object, and may communicate the results to the peer node 202 storing the data object.

For instance, in some implementations, the peer node 204 storing the access control list (ACL) may identify whether the access control list (ACL) grants the requested access to the requesting peer node 206, and may send to the peer node 202 an indication of whether or not the access is allowed. In other implementations, either the peer node 202 storing the data object or the peer node storing the access control list (ACL) may employ another peer node within the peer-to-peer overlay network to identity whether the access control list (ACL) grants the requested access to the requesting peer node 206. According to any of the various implementations, the peer node 202 storing the data object may grant or deny the requested access according to the authorized access indicated by the access control list (ACL) as determined directly or as reported by another peer node.

Exemplary Peer Nodes

Figure 4:
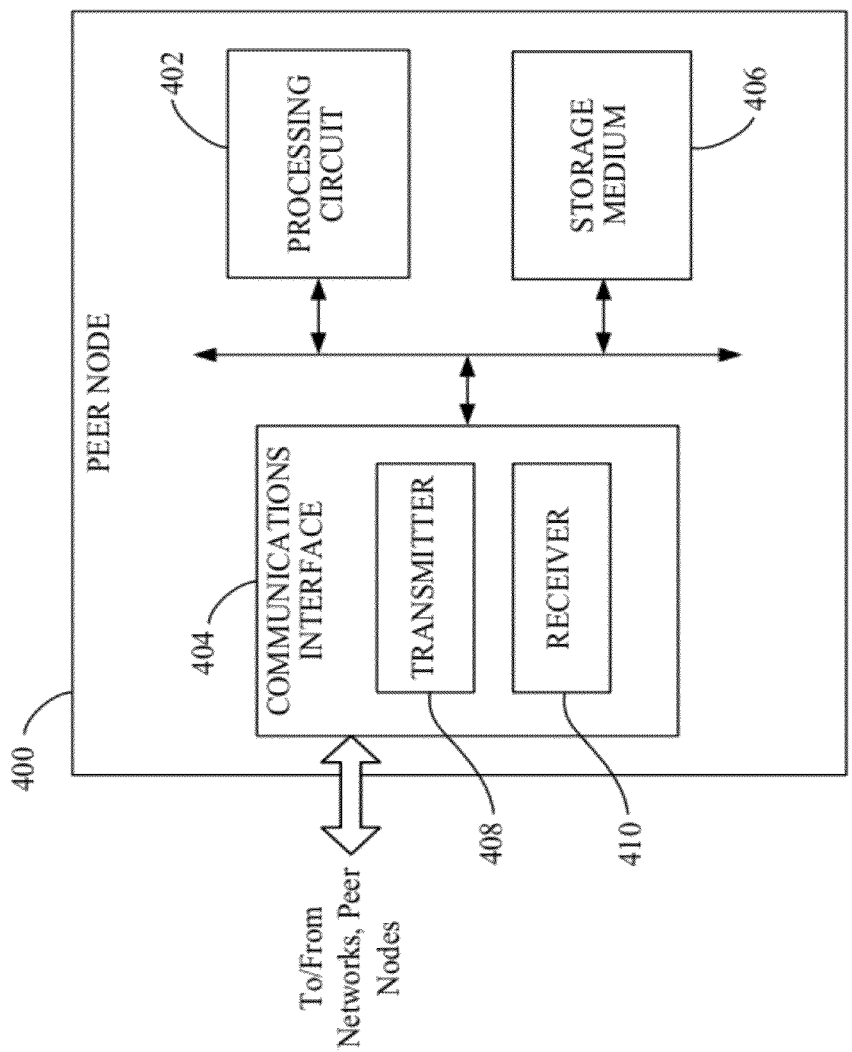
FIG. 4 is a block diagram illustrating select components of a peer node according to at least one implementation.

FIG. 4 is a block diagram illustrating select components of a peer node 400 according to at least one implementation. The peer node 400 may include a processing circuit 402 coupled to a communications interface 404 and to a storage medium 406.

The processing circuit 402 is arranged to obtain, process and/or send data, control data access and storage, issue commands, and control other desired operations. The processing circuit 402 may comprise circuitry configured to implement desired programming provided by appropriate media in at least one embodiment. For example, the processing circuit 402 may be implemented as one or more of a processor, a controller, a plurality of processors and/or other structure configured to execute executable instructions including, for example, software and/or firmware instructions, and/or hardware circuitry. Embodiments of the processing circuit 402 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor but, in the alternative, the processor may be any conventional processor, controller, microcontroller, or state machine. A processor may also be implemented as a combination of computing components, such as a combination of a DSP and a microprocessor, a number of microprocessors, one or more microprocessors in conjunction with a DSP core, or any other such configuration. These examples of the processing circuit 402 are for illustration and other suitable configurations within the scope of the present disclosure are also contemplated.

The communications interface 404 is configured to facilitate wireless and/or wired communications of the peer node 400. For example, the communications interface 404 may be configured to communicate information bi-directionally with respect to other peer nodes in a peer-to-peer overlay network. The communications interface 404 may be coupled with an antenna and may include wireless transceiver circuitry, including at least one transmitter 408 and/or at least one receiver 410 (e.g., one or more transmitter/receiver chains) for wireless communications with the peer-to-peer overlay network, and/or may include as a network interface card (NIC), a serial or parallel connection, a Universal Serial Bus (USB) interface, a Firewire interface, a Thunderbolt interface, or any other suitable arrangement for communicating with respect to public and/or private networks.

The storage medium 406 may represent one or more devices for storing programming and/or data, such as processor executable code or instructions (e.g., software, firmware), electronic data, databases, or other digital information. The storage medium 406 may be any available media that can be accessed by a general purpose or special purpose processor. By way of example and not limitation, the storage medium 406 may include read-only memory (e.g., ROM, EPROM, EEPROM), random access memory (RAM), magnetic disk storage mediums, optical storage mediums, flash memory devices, and/or other non-transitory computer-readable mediums for storing information. The storage medium 406 may be coupled to the processing circuit 402 such that the processing circuit 402 can read information from, and write information to, the storage medium 406. In the alternative, the storage medium 406 may be integral to the processing circuit 402.

According to one or more features of the peer node 400, the processing circuit 402 may be adapted to perform any or all of the processes, functions, steps and/or routines related to the various peer nodes as described herein above with reference to FIGS. 1-3 (e.g., peer node 104A-104F, 202, 204 and/or 206). As used herein, the term "adapted" in relation to the processing circuit 402 may refer to the processing circuit 402 being one or more of configured, employed, implemented, or programmed to perform a particular process, function, step and/or routine according to various features.

Figure 5:
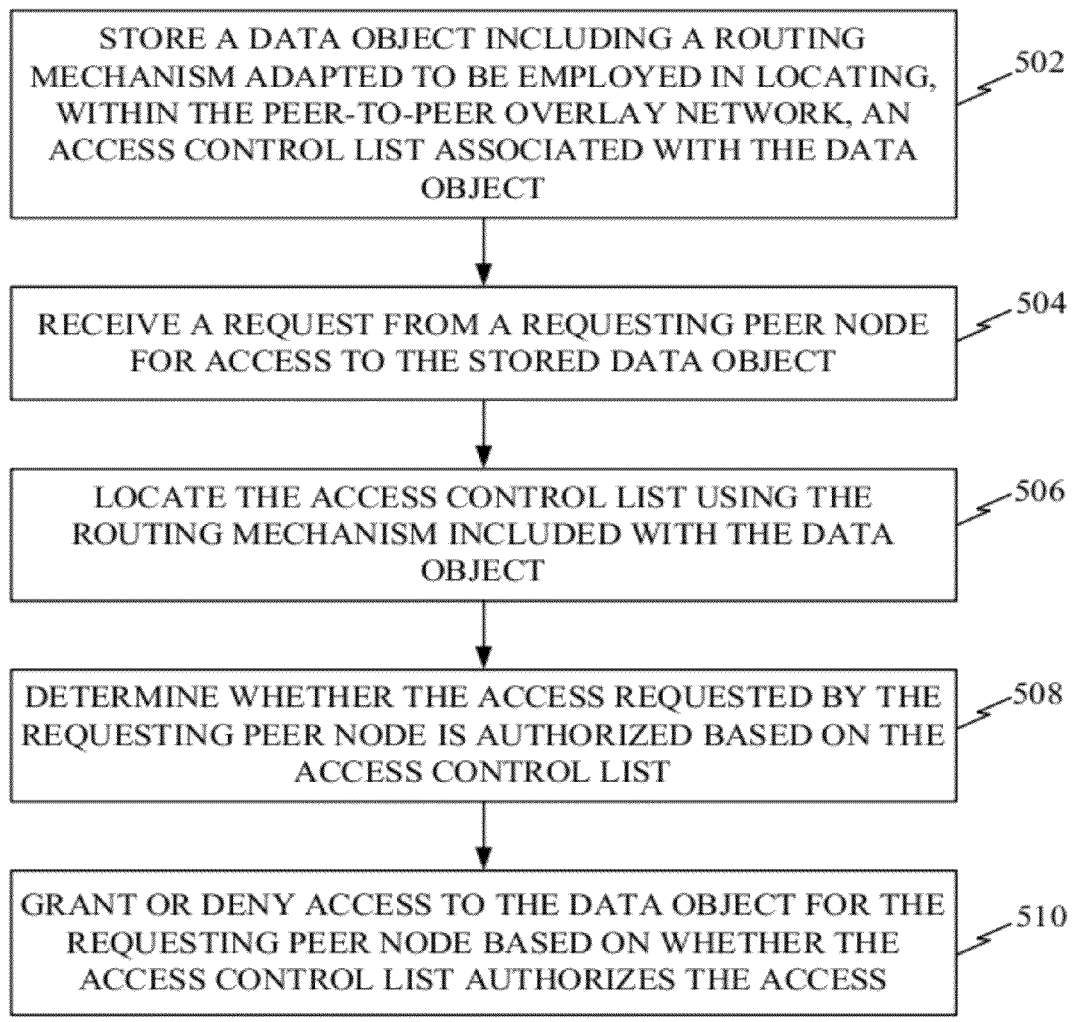
FIG. 5 is a flow diagram illustrating an example of at least one implementation of a method operational on a peer node storing a data object for facilitating access control for the stored data object in a peer-to-peer overlay network.

FIG. 5 is a flow diagram illustrating an example of at least one implementation of a method operational on a peer node, such as the peer node 400, storing a data object for facilitating access control for the stored data object in a peer-to-peer overlay network (e.g., network 102 in FIGS. 1 and 2). With reference to both of FIGS. 4 and 5, a data object may be received and stored at step 502. For example, the processing circuit 402 may receive, via the communications interface 404, a data object from the peer-to-peer overlay network, and may store the received data object in the storage medium 406. The data object includes a routing mechanism that is adapted for use in locating an associated access control list within the peer-to-peer overlay network. Such a routing mechanism is adapted to locate the associated access control list without relying on a central server or stable host. By way of example and not limitation, the routing mechanism can comprise a Universal Resource Identifier (URI).

The peer node 400 may receive a request for access to the stored data object from a requesting peer node at step 504. For example, the processing circuit 402 may receive a communication on the peer-to-peer overlay network via the communications interface 404, which communication may request access (e.g., read access, read/write access) to the data object stored in the storage medium 406. In at least some implementations, the processing circuit 402 may be adapted to authenticate the requesting peer node using any conventional authentication algorithm.

At step 506, the peer node 400 may locate the access control list (ACL) using the routing mechanism included with the stored data object. For example, the processing circuit 402 may retrieve the data object from the storage medium 406 and may identify the routing mechanism data included with the data object. Using the routing mechanism data, the processing circuit 402 can locate the associated access control list (ACL) in the peer-to-peer overlay network. For example, the routing mechanism data may specify the location (e.g., an address) of the access control list to which the processing circuit 402 can send a message for obtaining the access control list (ACL). In another example, the routing mechanism data may specify an identity (e.g., a name) of the access control list (ACL) in the peer-to-peer overlay network, and the processing circuit 402 can send a request on the peer-to-peer overlay network for the access control list (ACL) using the specified identity.

After the associated access control list (ACL) is located, the peer node 400 can determine at step 508 whether the access requested by the requesting peer node is authorized, based on the associated access control list (ACL). In at least one implementation, the peer node 400 can obtain the access control list (ACL), or a copy thereof, and determine whether the access control list (ACL) indicates that the requested access is authorized for the requesting peer node. For example, the processing circuit may send a request through the peer-to-peer overlay network for the access control list (ACL) using the communications interface 404. In response to the request, the processing circuit 402 may receive, via the communications interface 404, the access control list (ACL) or a copy thereof. Upon receipt of the access control list (ACL), the processing circuit may analyze the received access control list (ACL) to determine whether it indicates that the requesting peer node is authorized to access the data object as requested.

In at least some implementations, the peer node 400 may cache a copy of the access control list (ACL) associated with the stored data object after obtaining the access control list (ACL) from the peer-to-peer overlay network. For example, the processing circuit 402 may store a copy of the obtained access control list (ACL) in the storage medium 406. In the case where access to a data object is requested often in the peer-to-peer overlay network, storing the associated access control list (ACL) can reduce the bandwidth usage and the round-trip latency for performing the access control for the popular data object.

In one or more other implementations, the peer node 400 may determine whether the requested access is authorized at step 508 by receiving an indication from another peer node. For example, the processing circuit 402 may send an inquiry via the communications interface 404 to the peer node in the peer-to-peer overlay network where the access control list (ACL) is stored. The inquiry may request an indication whether the request access to the data object is authorized for the requesting peer node. In such an implementation, the peer node storing the access control list (ACL) or some other peer node on the peer-to-peer overlay network may analyze the access control list (ACL) to determine whether it indicates that the requesting peer node is authorized to access the data object as requested. The peer node that analyzes the access control list (ACL) can send an indication to the peer node 400, whereupon the processing circuit 402 receives the indication via the communication interface 404 and determines whether the received indication denotes the requested access as authorized or unauthorized.

At step 510, the peer node 400 may grant or deny access to the data object for the requesting peer node based on whether the access control list authorizes the requested access. For example, if the processing circuit 402 determines, either from the access control list (ACL) or from a received indication based on the access control list (ACL), that the requesting peer node is authorized to access the data object in the manner requested, then the processing circuit 402 may grant the requested access to the requesting peer node. If, however, the processing circuit 402 determines that the requesting peer node is not authorized to access the data object in the manner requested, then the processing circuit 402 may deny the requested access to the requesting peer node.

Figure 6:
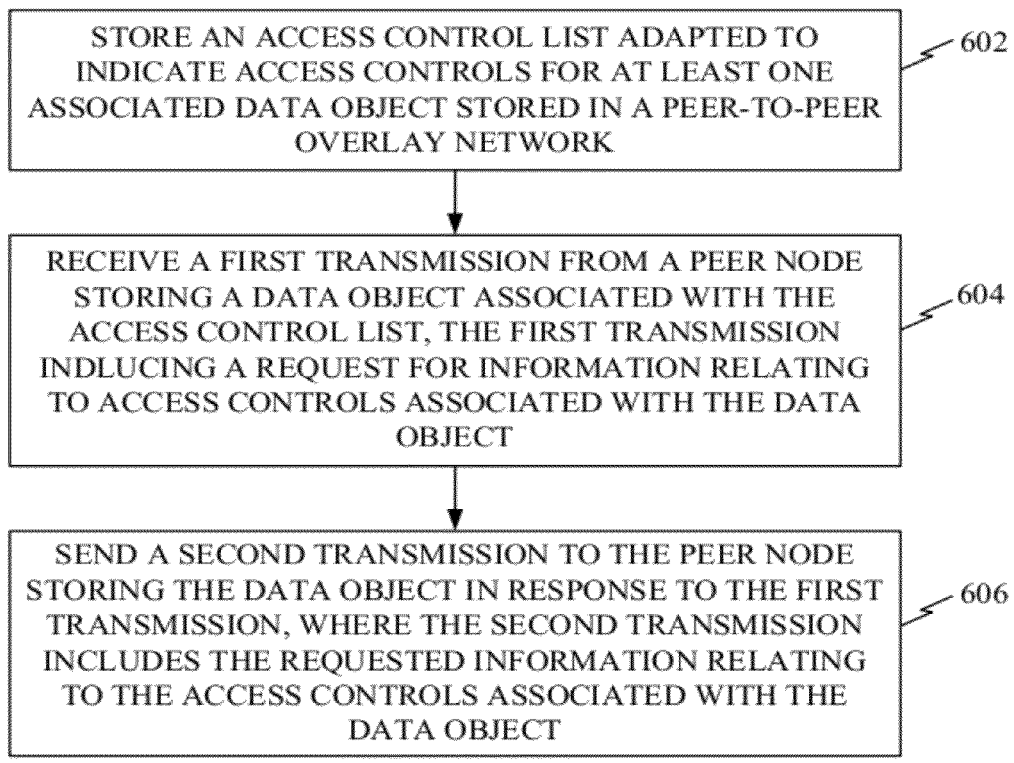
FIG. 6 is a flow diagram illustrating an example of at least one implementation of a method operational on a peer node storing an access control list (ACL) for facilitating access control for a data object stored in a peer-to-peer overlay network.

FIG. 6 is a flow diagram illustrating an example of at least one implementation of a method operational on a peer node, such as the peer node 400, storing an access control list (ACL) for facilitating access control for a data object stored in a peer-to-peer overlay network (e.g., network 102 in FIGS. 1 and 2). With reference to both of FIGS. 4 and 6, an access control list may be received and stored at step 602. For example, the processing circuit 402 may receive an access control list from the peer-to-peer overlay network via the communications interface 404, and may store the received access control list in the storage medium 406. The peer node 400 may not act as a centralized peer node for all access control lists, nor may the stored access control list be associated with all of the data objects in the peer-to-peer overlay network. Instead, the peer node 400 may act as one of a plurality of peer nodes in the peer-to-peer overlay network storing respective access control lists that are each associated with one or more respective data objects in the peer-to-peer overlay network.

The access control list may be adapted to indicate access controls for an associated data object within the peer-to-peer overlay network. In some implementations, the access control list may be adapted to indicate access controls for a plurality of associated data objects within the peer-to-peer overlay network. The access control list is further adapted to be located within the peer-to-peer overlay network by a routing mechanism that is stored with each of the one or more associated data objects. As discussed herein, such a routing mechanism may comprise a Universal Resource Identifier (URI) in at least some implementations.

At step 604, the peer node 400 can receive a first transmission from a peer node that is storing a data object associated with the access control list, where the first transmission includes a request for information relating to the access controls associated with the data object. For example, the processing circuit 402 may receive the first transmission via the communications interface 404. In response to receiving the first transmission, the peer node 400 may send, at step 606, a second transmission to the peer node that is storing the data object, which second transmission includes the requested information relating to the access controls associated with the data object. For example, the processing circuit 402 may send the second transmission over the peer-to-peer overlay network via the communications interface 404.

In at least one implementation, the request for information relating to the access controls associated with the data object may include a request for the access control list. Such a request for the access control list may simply be a request for access to the access control list, a request for a copy of the access control list and/or a request for the actual access control list data object. In such implementations, the second transmission sent by the peer node 400 may include the requested access control list information.

In one or more other implementations, the request for information relating to the access controls associated with the data object may include an inquiry requesting an indication whether an access to the data object that has been requested by a requesting peer node is authorized by the access control list (ACL). In such implementations, the processing circuit 402 may analyze the access control list (ACL) to determine whether or not the access control list indicates that the access requested by the requesting peer node is authorized. The peer node 400 may then send the second transmission with the requested indication denoting whether the access requested by the requested peer node is authorized.

One or more of the components, steps, features and/or functions illustrated in FIGS. 1, 2, 3, 4, 5 and/or 6 may be rearranged and/or combined into a single component, step, feature or function or embodied in several components, steps, or functions. Additional elements, components, steps, and/or functions may also be added without departing from the scope of the present disclosure. The apparatus, devices, components and/or transmission frames illustrated in FIGS. 1, 2 and/or 4 may be configured to perform one or more of the methods, features, or steps described in FIGS. 3, 5 and/or 6. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The terms "machine-readable medium", "computer-readable medium", and/or "processor-readable medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium", "computer-readable medium", and/or "processor-readable medium" and executed by one or more processors, machines and/or devices.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the embodiments described herein can be implemented in different systems without departing from the scope of the disclosure. It should be noted that the foregoing embodiments are merely examples and are not to be construed as limiting the disclosure. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:
1. A peer node, comprising:
 a communications interface adapted to facilitate communication on a peer-to-peer overlay network;
 a storage medium including a data object stored therein, wherein the data object includes a routing mechanism adapted to be utilized in locating within the peer-to-peer overlay network an access control list associated with the data object; and a processing circuit coupled to the communications interface and the storage medium, the processing circuit adapted to:

receive a request from a requesting peer node for access to the data object in the storage medium;

locate the access control list in the peer-to-peer overlay network using the routing mechanism included with the data object;

determine whether the access requested by the requesting peer node is authorized based on the access control list; and grant or deny access to the data object for the requesting peer node based on whether the access control list authorizes the requested access.

2. The peer node of claim 1, wherein the routing mechanism included with the data object comprises a Universal Resource Identifier (URI).

3. The peer node of claim 1, wherein the routing mechanism is adapted to locate the data object within the peer-to-peer overlay network without the use of a central server or stable host.

4. The peer node of claim 1, wherein the processing circuit is further adapted to:

obtain the access control list; and analyze the access control list to determine whether or not the access control list indicates that the access requested by the requesting peer node is authorized.

5. The peer node of claim 1, wherein the processing circuit is further adapted to:

send an inquiry to a peer node storing the access control list, where the inquiry requests an indication whether the access requested by the requesting peer node is authorized; and receive the indication denoting whether the access requested by the requested peer node is authorized.

6. The peer node of claim 5, wherein the indication denoting whether the access requested by the requested peer node is authorized is received from one of the peer node storing the access control list or another peer node of the peer-to-peer overlay network.

7. The peer node of claim 1, wherein the processing circuit is further adapted to:

cache a copy of the access control list associated with the data object in the storage medium.

8. The peer node of claim 1, wherein:

the storage medium further includes the access control list associated with the data object; and the routing mechanism included with the data object indicates that the access control list is located at the peer node.

9. The peer node of claim 1, wherein the processing circuit is further adapted to authenticate the requesting peer node.

10. A method operational on a peer node, comprising:

storing a data object in a storage medium, wherein the data object includes a routing mechanism adapted to be employed in locating within a peer-to-peer overlay network an access control list associated with the data object;

receiving a request from a requesting peer node for access to the stored data object;

locating the access control list in the peer-to-peer overlay network using the routing mechanism included with the data object;

determining whether the access requested by the requesting peer node is authorized based on the access control list; and granting or denying access to the data object for the requesting peer node based on whether the access control list authorizes the requested access.

11. The method of claim 10, wherein the routing mechanism included with the data object comprises a Universal Resource Identifier (URI).

12. The method of claim 10, wherein determining whether the access requested by the requesting peer node is authorized based on the access control list comprises:

obtaining the access control list; and analyzing the access control list to determine whether or not the access control list indicates that the access requested by the requesting peer node is authorized.

13. The method of claim 10, wherein determining whether the access requested by the requesting peer node is authorized based on the access control list comprises:

sending an inquiry to a peer node storing the access control list, where the inquiry requests an indication whether the access requested by the requesting peer node is authorized; and receiving the indication denoting whether the access requested by the requested peer node is authorized.

14. The method of claim 13, wherein receiving the indication denoting whether the access requested by the requested peer node is authorized comprises:

receiving the indication from the peer node storing the access control list.

15. The method of claim 13, wherein receiving the indication denoting whether the access requested by the requested peer node is authorized comprises:

receiving the indication from another peer node of the peer-to-peer network.

16. The method of claim 10, further comprising:

caching a copy of the access control list associated with the data object in the storage medium.

17. The method of claim 10, further comprising:

authenticating the requesting peer node.

18. A peer node, comprising:

means for storing a data object in a storage medium, wherein the data object includes a routing mechanism adapted to be employed in locating an access control list associated with the data object within a peer-to-peer overlay network;

means for receiving a request from a requesting peer node for access to the stored data object;

means for locating the access control list in the peer-to-peer overlay network using the routing mechanism included with the data object;

means for determining whether the access requested by the requesting peer node is authorized based on the access control list; and means for granting or denying access to the data object for the requesting peer node based on whether the access control list authorizes the requested access.

19. A non-transitory processor-readable storage medium comprising instructions operational on a peer node, which when executed by a processor causes the processor to:

store a data object in a storage medium, wherein the data object includes a routing mechanism adapted to be employed in locating an access control list associated with the data object within a peer-to-peer overlay network;

receive a request from a requesting peer node for access to the stored data object;

locate the access control list in the peer-to-peer overlay network using the routing mechanism included with the data object;
determine whether the access requested by the requesting peer node is authorized based on the access control list; and
grant or deny access to the data object for the requesting peer node based on whether the access control list authorizes the requested access.

20. A peer node, comprising:
a communications interface adapted to facilitate communication on a peer-to-peer overlay network;
a storage medium including an access control list stored therein, wherein the access control list is adapted to indicate access controls for at least one associated data object; and
a processing circuit coupled to the communications interface and the storage medium, the processing circuit adapted to:
receive a first transmission from a peer node storing a data object associated with the access control list, wherein the data object includes a routing mechanism adapted to locate the access control list within the peer-to-peer overlay network, and wherein the first transmission includes a request for information relating to access controls associated with the data object; and
send a second transmission to the peer node storing the data object in response to the first transmission, wherein the second transmission includes the requested information relating to the access controls associated with the data object.

21. The peer node of claim 20, wherein the communications interface is adapted to facilitate communication on the peer-to-peer overlay network without the use of a central server or stable host.

22. The peer node of claim 20, wherein the access control list is adapted to be located within the peer-to-peer overlay network with a routing mechanism stored with the at least one associated data object.

23. The peer node of claim 22, wherein the routing mechanism comprises a Universal Resource Identifier (URI).

24. The peer node of claim 20, wherein the access control list is adapted to indicate access controls for a plurality of different data objects stored in the peer-to-peer overlay network.

25. The peer node of claim 20, wherein the processing circuit is further adapted to:
receive the first transmission including a request for the access control list.

26. The peer node of claim 25, wherein the processing circuit is further adapted to:
send second transmission including the access control list to the peer node storing the data object.

27. The peer node of claim 20, wherein the processing circuit is further adapted to:
receive the first transmission including an inquiry requesting an indication whether an access to the data object requested by a requesting peer node is authorized.

28. The peer node of claim 27, wherein the processing circuit is further adapted to:
analyze the access control list to determine whether or not the access control list indicates that the access requested by the requesting peer node is authorized; and
send the second transmission including the requested indication denoting whether the access requested by the requested peer node is authorized.

29. A method operational on a peer node, comprising:
storing an access control list in a storage medium, wherein the access control list is adapted to indicate access controls for at least one associated data object in a peer-to-peer overlay network;
receiving a first transmission from a peer node storing a data object associated with the access control list, wherein the data object includes a routing mechanism adapted to locate the access control list within the peer-to-peer overlay network, and wherein the first transmission includes a request for information relating to access controls associated with the data object; and
sending a second transmission to the peer node storing the data object in response to the first transmission, wherein the second transmission includes the requested information relating to the access controls associated with the data object.

30. The method of claim 29, wherein the access control list is adapted to be located within the peer-to-peer overlay network with a routing mechanism stored with the at least one associated data object.

31. The method of claim 30, wherein the routing mechanism comprises a Universal Resource Identifier (URI).

32. The method of claim 29, wherein receiving the first transmission including the request for information relating to access controls associated with the data object, comprises:
receiving the first transmission including a request for the access control list.

33. The method of claim 32, wherein sending the second transmission including the requested information relating to the access controls associated with the data object, comprises:
sending the second transmission including the access control list to the peer node storing the data object.

34. The method of claim 29, wherein receiving the first transmission requesting information relating to access controls associated with the data object, comprises:
receiving an inquiry requesting an indication whether an access to the data object requested by a requesting peer node is authorized.

35. The method of claim 34, wherein sending the second transmission including the requested information relating to the access controls associated with the data object, comprises:
analyzing the access control list to determine whether or not the access control list indicates that the access requested by the requesting peer node is authorized; and
sending the second transmission including the requested indication denoting whether the access requested by the requested peer node is authorized.

36. A peer node, comprising:
means for storing an access control list in a storage medium, wherein the access control list is adapted to indicate access controls for at least one associated data object in a peer-to-peer overlay network;
means for receiving a first transmission from a peer node storing a data object associated with the access control list, wherein the data object includes a routing mechanism adapted to locate the access control list within the peer-to-peer overlay network, and wherein the first transmission includes a request for information relating to access controls associated with the data object; and
means for sending a second transmission to the peer node storing the data object in response to the first transmission, wherein the second transmission includes the requested information relating to the access controls associated with the data object.

37. A non-transitory processor-readable storage medium comprising instructions operational on a peer node, which when executed by a processor causes the processor to:
- store an access control list in a storage medium, wherein the access control list is adapted to indicate access controls for at least one associated data object in a peer-to-peer overlay network;
- receive a first transmission from a peer node storing a data object associated with the access control list, wherein the data object includes a routing mechanism adapted to locate the access control list within the peer-to-peer overlay network, and wherein the first transmission includes a request for information relating to access controls associated with the data object; and
- send a second transmission to the peer node storing the data object in response to the first transmission, wherein the second transmission includes the requested information relating to the access controls associated with the data object.

* * * * *